(12) United States Patent
Yasuda

(10) Patent No.: US 7,710,493 B2
(45) Date of Patent: May 4, 2010

(54) IMAGE-PICKUP APPARATUS AND FOCUS CONTROL METHOD

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/782,063

(22) Filed: Jul. 24, 2007

(65) Prior Publication Data
US 2008/0024648 A1 Jan. 31, 2008

(30) Foreign Application Priority Data
Jul. 25, 2006 (JP) .............................. 2006-201996

(51) Int. Cl.
H04N 5/232 (2006.01)
G03B 13/20 (2006.01)
G03B 13/36 (2006.01)

(52) U.S. Cl. .................... 348/348; 348/353; 396/82; 396/130

(58) Field of Classification Search ............... 348/348, 348/353; 396/80, 82, 130
See application file for complete search history.

(56) References Cited

U.S. PATENT DOCUMENTS

| 5,737,645 | A  | * | 4/1998  | Saito .......................... 396/98 |
| 6,999,684 | B2 | * | 2/2006  | Sato et al. .................. 396/135 |
| 7,471,330 | B2 | * | 12/2008 | Okawara ..................... 348/353 |
| 2005/0031330 | A1 | * | 2/2005 | Nonaka et al. .............. 396/104 |
| 2006/0033831 | A1 | * | 2/2006 | Ejima et al. ............ 348/333.01 |

\* cited by examiner

*Primary Examiner*—Jason Whipkey
(74) *Attorney, Agent, or Firm*—Cowan, Liebowitz & Latman, P.C.

(57) ABSTRACT

An image-pickup apparatus includes a first detector configured to generate first information corresponding to a contrast state of a picked-up image, a second detector configured to detect second information that is used for focus control and different from the first information, a controller configured to provide the focus control, and a first operating member operable by a user, wherein the controller provides the focus control that uses the first information but does not use the second information when the first operating member is not operated, and provides the focus control that uses at least the second information when the operating member is operated.

6 Claims, 10 Drawing Sheets

IMAGE-PICKUP APPARATUS AND FOCUS CONTROL METHOD

BACKGROUND OF THE INVENTION

The present invention relates generally to an image-pickup apparatus, such as a video camera and a digital still camera, and more particularly to focus control in the image-pickup apparatus.

In the autofocus ("AF") control in a video camera and the like, a TV-AF method is mainstream, which generates an AF evaluation value signal indicative of sharpness or a contrast state of an image signal generated by using an image-pickup element, and searches for a focus lens position that maximizes the AF evaluation value signal level.

One AF method is an external ranging method or external ranging (or distance-measuring) phase (difference) detection method that provides a ranging sensor independent of an image-pickup lens, operates an in-focus position of a focus lens from a distance to the object detected by the ranging sensor, and moves the focus lens to the in-focus position.

The external phase difference detection method divides a luminous flux from the object into two luminous fluxes, receives a pair of divided rays through a pair of light-receiving element arrays (line sensors), and detects a shift amount between the images formed on the pair of line sensors or a phase difference. Then, this method calculates an object distance based on the phase difference by using the triangulation, and moves a focus lens to an in-focus position corresponding to the object distance.

An internal phase detection method is also known, which divides into two the luminous flux that has passed an exit pupil of an image-pickup lens, and receives the two divided rays through a pair of line sensor. Then, this method detects a phase difference between the two images on the pair of line sensors, calculates a defocus amount of the image-pickup lens from the phase difference, and moves the focus lens by an amount corresponding to the defocus amount.

In order to utilize the high focusing precision of the TV-AF method and the focusing speed of the phase difference detection method, Japanese Patent Laid-Open No. 2005-84426 proposes a hybrid AF method that combines these AF methods. The hybrid AF method proposed in Japanese Patent Laid-Open No. 2005-84426 obtains an in-focus state by using the phase difference detection method, when the TV-AF system does not provide the in-focus state due to low brightness or low contrast of the object.

Japanese Patent Laid-Open No. 05-346536 proposes an image-pickup apparatus that utilizes the phase difference detection method to find a coincidence between image patterns, i.e., the similarity between the two images on the line sensors, and to thereby determine the reliability of the distance measurement result.

However, the conventional hybrid AF method initially provides TV-AF focus control, and then determines whether phase detection focus control is necessary, depending upon a condition of the TV-AF focus control. Therefore, an advantage of the phase difference detection system, i.e., responsive and fast focus control, is unavailable, when a photographer desires.

BRIEF SUMMARY OF THE INVENTION

The present invention is directed to an image-pickup apparatus and a focus control method which can provide focus control of the AF method fit for a user's (or photographer's) intension.

An image-pickup apparatus according to one aspect of the present invention includes a first detector configured to generate first information corresponding to a contrast state of a picked-up image, a second detector configured to detect second information that is used for focus control and different from the first information, a controller configured to provide the focus control, and a first operating member operable by a user, wherein the controller provides the focus control that uses the first information but does not use the second information when the first operating member is not operated, and provides the focus control that uses at least the second information when the operating member is operated.

A focus control method according to another aspect of the present invention includes the steps of obtaining first information relating to a contrast state of an picked-up image, obtaining second information that is used for focus control and different from the first information, detecting an operation of an first operating member operable by a user, and providing the focus control that uses the first information but does not use the second information when an operation of the first operating member is not detected, and providing the focus control that uses at least the second information when the operation of the first operating member is detected.

Other objects and further features of the present invention will become readily apparent from the following description of the preferred embodiments with reference to accompanying drawings.

DETAILED DESCRIPTION OF THE PREFERRED EMBODIMENTS

Figure 1:
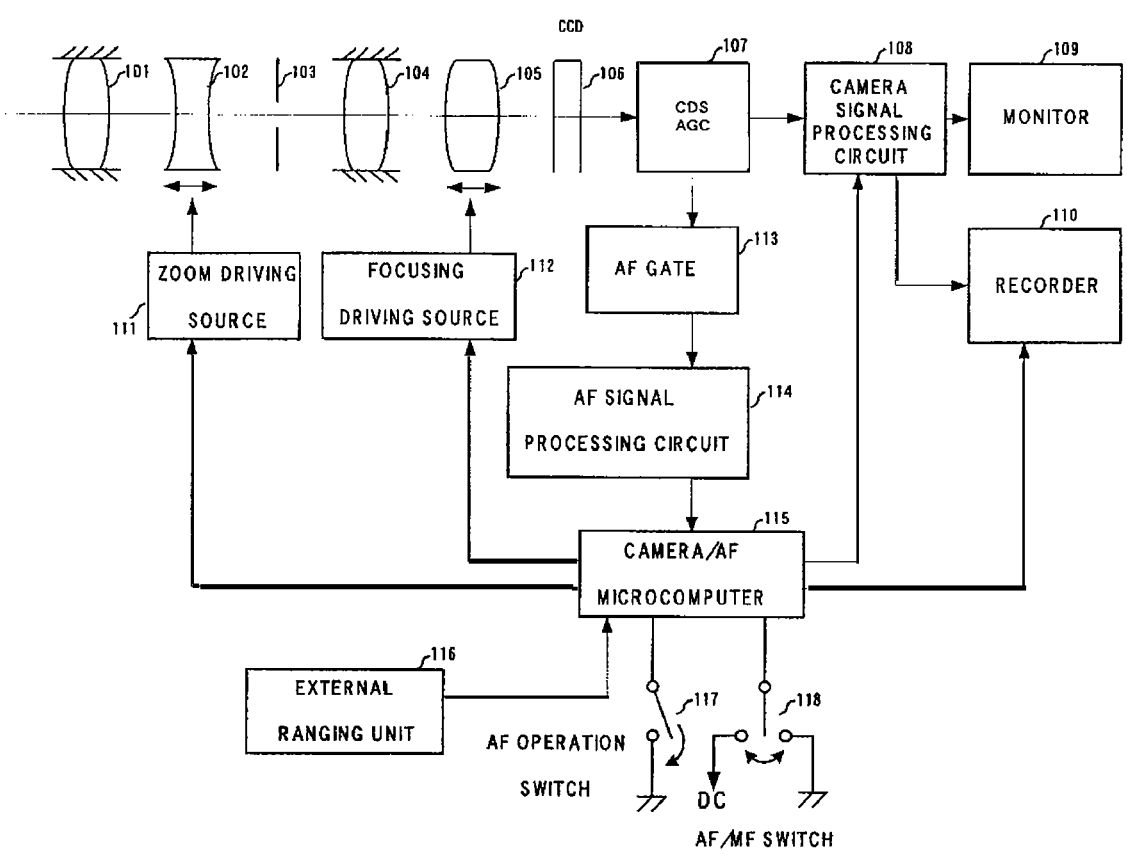
FIG. 1 is a block diagram of a video camera according to one embodiment of the present invention.

Referring now to the drawings, a description will be given of a preferred embodiment according to the present invention.

FIG. 1 shows a structure of a video camera (image-pickup apparatus) according to one embodiment of the present invention. While this embodiment discusses the video camera, the present invention is applicable to another image-pickup element, such as a digital still camera.

In FIG. 1, 101 denotes a first fixed lens, 102 a magnification-varying lens that moves in the optical-axis direction and varies a magnification, and 103 a stop aperture. 104 denotes a second fixed lens, 105 denotes a focus compensator lens (referred to as a "focus lens" hereinafter) that serves not only to correct a movement of a focal plane caused by the magnification variance but also to provide focusing. The first fixed lens 101, the magnification-varying lens 102, the stop aperture 103, the second fixed lens 104, and the focus lens 105 constitute an image-pickup optical system.

106 denotes an image-pickup element as a photoelectric conversion element, such as a CCD sensor and a CMOS sensor. 107 denotes a CDS/AGC circuit that samples an output of the image-pickup element 106, and adjusts a gain.

108 denotes a camera signal processing circuit, which provides various image processes to an output signal from the CDS/AGC circuit 107, and generates a video signal. 109 denotes a monitor that includes an LCD or the like, and displays a video signal from the camera signal processing circuit 108. 110 is a recorder, which records a video signal from the camera signal processing circuit 108 in a recording medium, such as a magnetic tape, an optical disc, and a semiconductor memory.

111 denotes a zoom driving source that is used to move the magnification-varying lens 102. 112 denotes a focusing driving source that is used to move the focus lens 105. The zoom driving source 111 and the focusing driving source 112 include an actuator, such as a stepping motor, a DC motor, a variation motor, and a voice coil motor.

113 denotes an AF gate that allows a signal in a region used for focus detections in an output signal of all pixels from the CDS/AGC circuit 107. 114 is an AF signal processing circuit that serves as a first detector. The AF signal processing circuit 114 generates an AF evaluation value signal that serves as first information by extracting from the signal that has passed the AF gate 113, a high-frequency component and a brightness difference component that is generated from the high-frequency signal and expresses a difference between a maximum value and a minimum value of a brightness level in the signal that has passed the AF gate 113. The AF evaluation value signal is output to the camera/AF microcomputer 115. The AF evaluation value signal indicates sharpness (or a contrast state) of an image generated based on an output signal from the image-pickup element 106, but resultantly serves as a signal indicative of a focus state of the image-pickup optical system, because the sharpness depends upon the focusing state of the image-pickup optical system.

The camera/AF microcomputer as a controller (simply referred to as a "microcomputer" hereinafter) 115 governs controls of the entire operations of the video camera, and provides focus control that controls the focusing driving source 112, and moves the focus lens 105. The focus control of the microcomputer 115 includes focus control of the TV-AF method (simply referred to as "TV-AF" hereinafter), and focus control of the external phase difference detection system or external ranging system (simply referred to as "external AF" hereinafter).

Figure 6:
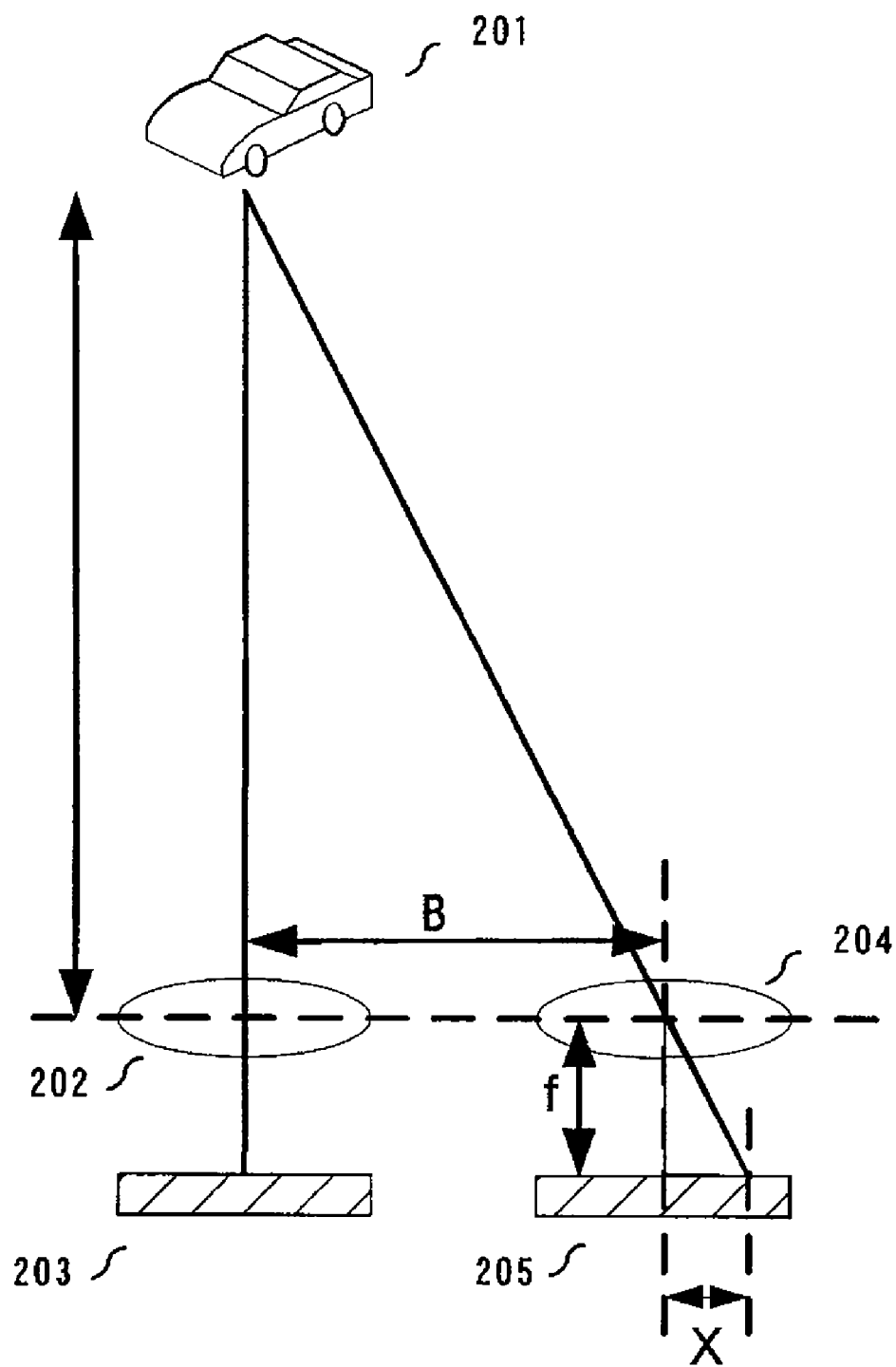
FIG. 6 is a view of a ranging principle in a passive phase difference method.
Figure 7:
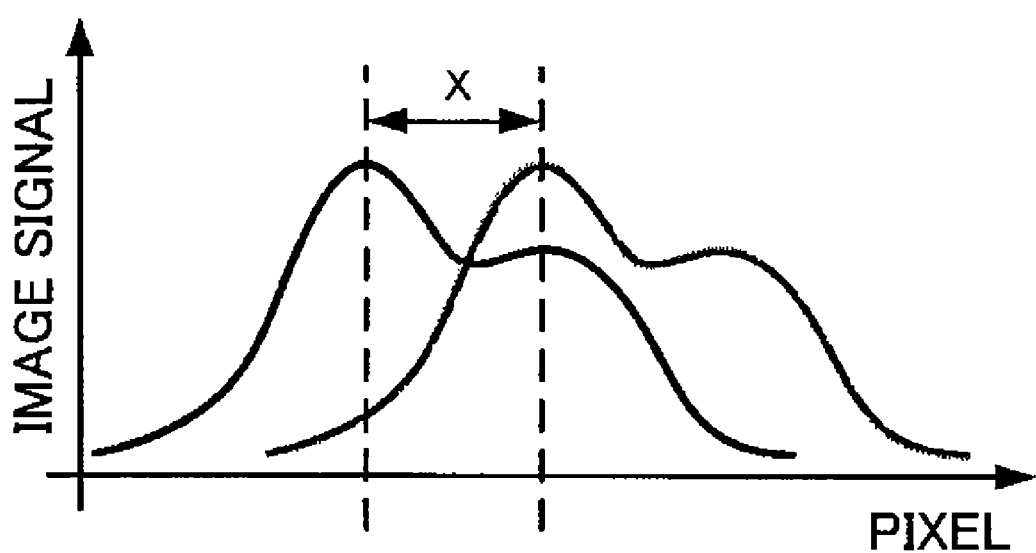
FIG. 7 is a view of an image signal in the passive phase difference method.

116 denotes an external ranging unit that serves as a second detector, and outputs a signal (second information which is referred to as "object distance information" hereinafter) corresponding to a distance to the object. Various ranging methods are conventionally used, and FIGS. 6 and 7 show a ranging principle of the passive phase difference method as one ranging method. The external ranging unit is provided different from the image-pickup optical system. In other words, a luminous flux from the object which does not pass the image-pickup optical system enters the external ranging unit.

In FIG. 6, 201 denotes an object, 202 a first image-forming lens, 203 a light-receiving element array, 204 a second image-forming lens, and 205 a second light-receiving element array. Each of the first and second light-receiving element arrays 203 and 205 includes an array of plural light-receiving elements (pixels). The first and second light-receiving element arrays 203 and 205 are arranged part from each other by a base length B.

The light that has passed the first imaging lens 202 among the light from the object 201 images on the first light-receiving element array 203, and the light that has passed the second imaging lens 204 images on the second light-receiving element array 205.

FIG. 7 shows illustrative output signals (image signals) from the first and second light-receiving element arrays 203 and 205. Since the first and second light-receiving element arrays 203 and 205 are separated from each other by the base length B, the image signal from the first light-receiving element array 203 and the image signal from the second light-receiving element array 205 shift by the number of pixels X. X can be operable when a correlation between the two image signals is operated by shifting the pixels, and a pixel shift amount is found that maximizes the correlation. A distance L to the object can be found by the following equation below using the triangulation principle and X, the base length B, and the focus lengths f of the image-forming lenses 202 and 204:

$L = B \cdot f / X$

The present invention is not limited to the passive ranging method, but may use another ranging method. For example, an active ranging method may be used, such as a system that projects the infrared ray and finds a distance using the triangulation principle, and a system that measures a propagation speed using an ultrasonic sensor. In addition, a pixel shift amount (second information) X may be output from the external ranging unit, and an object distance may be found using the microcomputer based on X.

The object distance information from the external ranging unit 116 is input into the microcomputer 115. The microcomputer 115, in turn, calculates, based on the input object distance information, a focus lens position (referred to as an "external ranging in-focus position" hereinafter) which provides an in-focus state relative to the object of the distance. The term "calculates," as used herein, means an operation using an equation as well as data reading of the in-focus position relative to the object distance stored in a memory (not shown).

Figure 8:
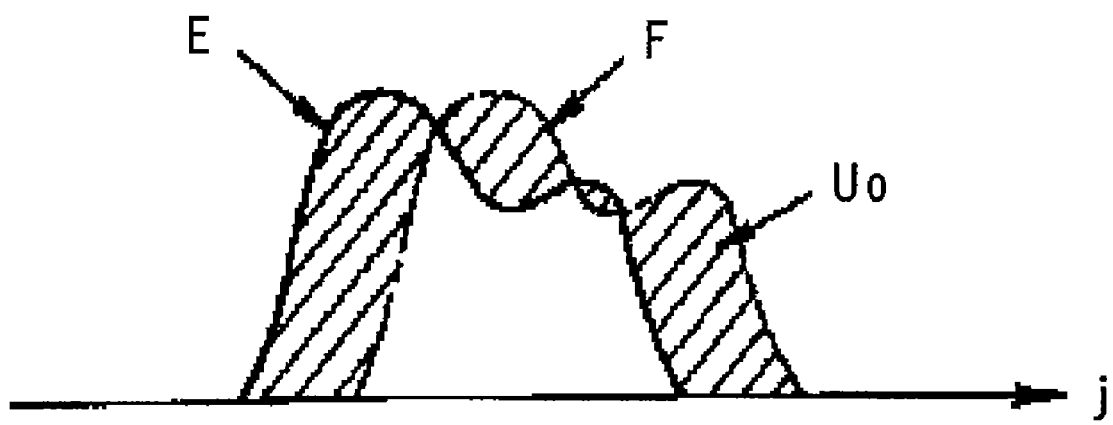
FIG. 8 is a view for explaining a coincidence between two images formed on a pair of light-receiving element arrays.

The microcomputer 115 also calculates the reliability of the object distance information. The reliability is a coincidence (correlation) between two images formed on a pair of light-receiving element arrays by two luminance fluxes split by two image-forming lenses in the external ranging unit 116. A calculation method of the reliability will be given with reference to FIG. 8.

First, Equation 1 below is calculated from intensity data of each of a first image (or image E in FIG. 8) and a second image (image F in FIG. 8) sampled by each light-receiving element array, where $a_j$ and $b_j$ are intensity data of an image, and N is the number of pixels included in the light-receiving element array:

$$U_o = \sum_{j=1}^{N} |a_j - b_j| \qquad \text{Equation 1}$$

Figure 9:
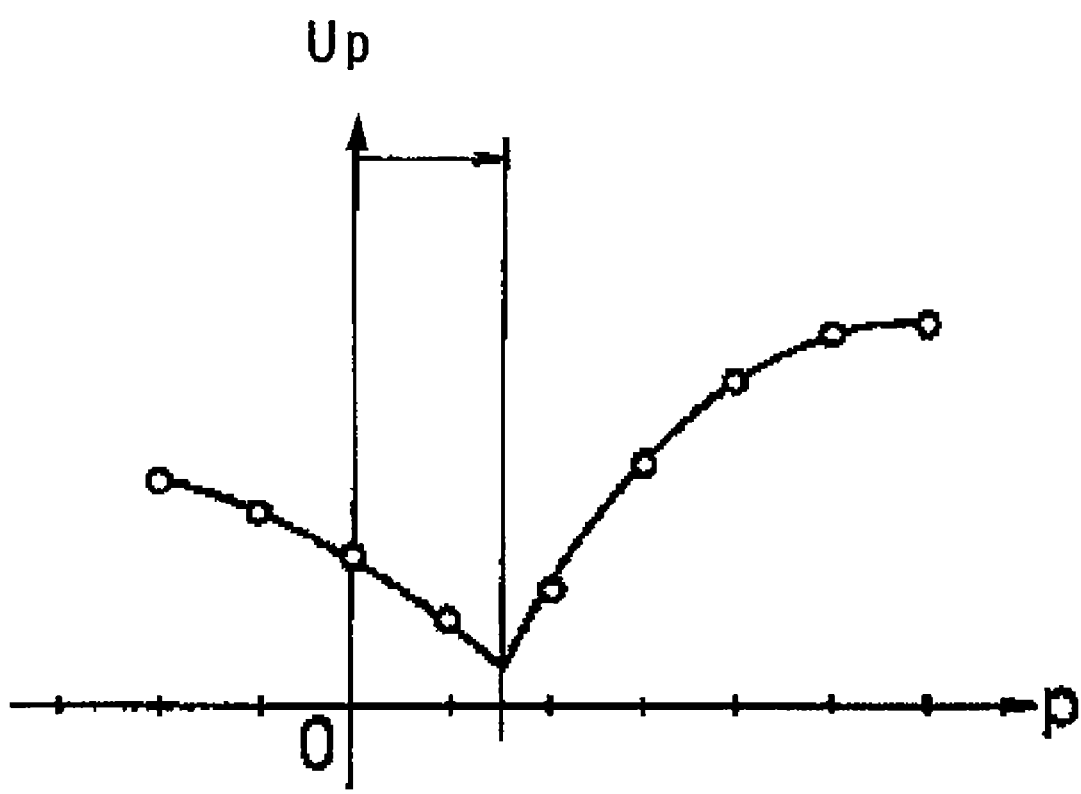
FIG. 9 is a view for explaining a coincidence between two images formed on a pair of light-receiving element arrays.

A value of $U_o$ in Equation 1 or an area of the beveled part in FIG. 9 becomes smaller, as the coincidence between two images increases, and minimum in the in-focus state. The calculation (that shifts sampling data of the image E relative to the image E by p pixels is performed for the image F, similar to a calculation of the value of $U_o$ in Equation 1, to find a value of $U_p$ defined in Equation 2 below, where p is an integer:

$$U_p = \sum_{j=1}^{N-p} |a_{j+p} - b_j| \quad \text{Equation 2}$$

Since $U_p$ becomes minimum at the shift amount that has the highest coincidence between the two images, a relative positional shift amount between two images can be found by finding the shift amount p as shown in FIG. 9.

However, a defocus amount corresponding to a shift of 1 pixel changes by 1 mm, and this value cannot be used as it is to detect the focal point. Accordingly, a displacement amount (h) of an image finer than the minimum size of one pixel is interpolated and operated from near the minimum value of $U_p$ in FIG. 9.

Reliability FNCLVL is calculated, for example, by Equation 3 below based on the image displacement amount (h) found through this operation:

$$FNCLVL = h \times 32/MAXDER \quad \text{Equation 3}$$

where 'MAXDER' represents an element whose value becomes smaller as the coincidence of the shapes of the two images becomes higher.

The above calculation method of the reliability of the object distance information is mere illustrative, and another calculation method may be used.

In FIG. 1, 117 denotes an AF operation switch that serves as a first operating member, and is operated or pressed when a photographer needs the AF. This switch 117 is configured to return to the original position when the manipulation is stopped. In other words, only when the switch 117 is pressed, a signal indicative of the manipulation of the switch is input into the microcomputer 115.

118 denotes an AF/MF switch that serves as a second operating member, and is manipulated when a photographer selects the AF or manual focus ("MF"). The switch 118 is configured to remain at its manipulated position even when the operation is stopped.

Referring now to FIGS. 2A to 6, a description will be given of the AF control performed by the microcomputer 115. This AF control is executed in accordance with a computer program stored in the microcomputer 115.

Figure 2A:
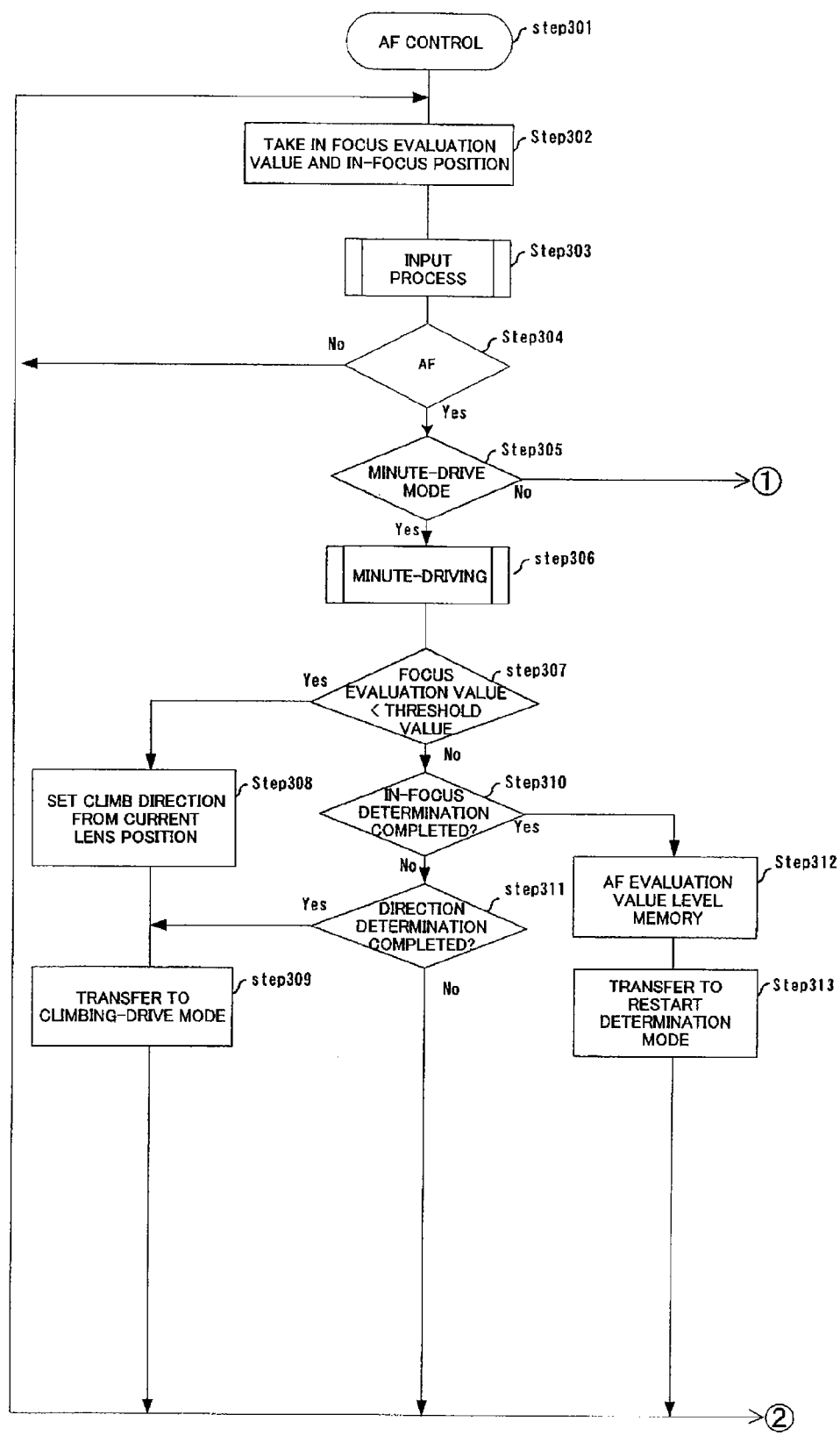
FIG. 2 is a flowchart of AF control according to one embodiment.
Figure 2B:
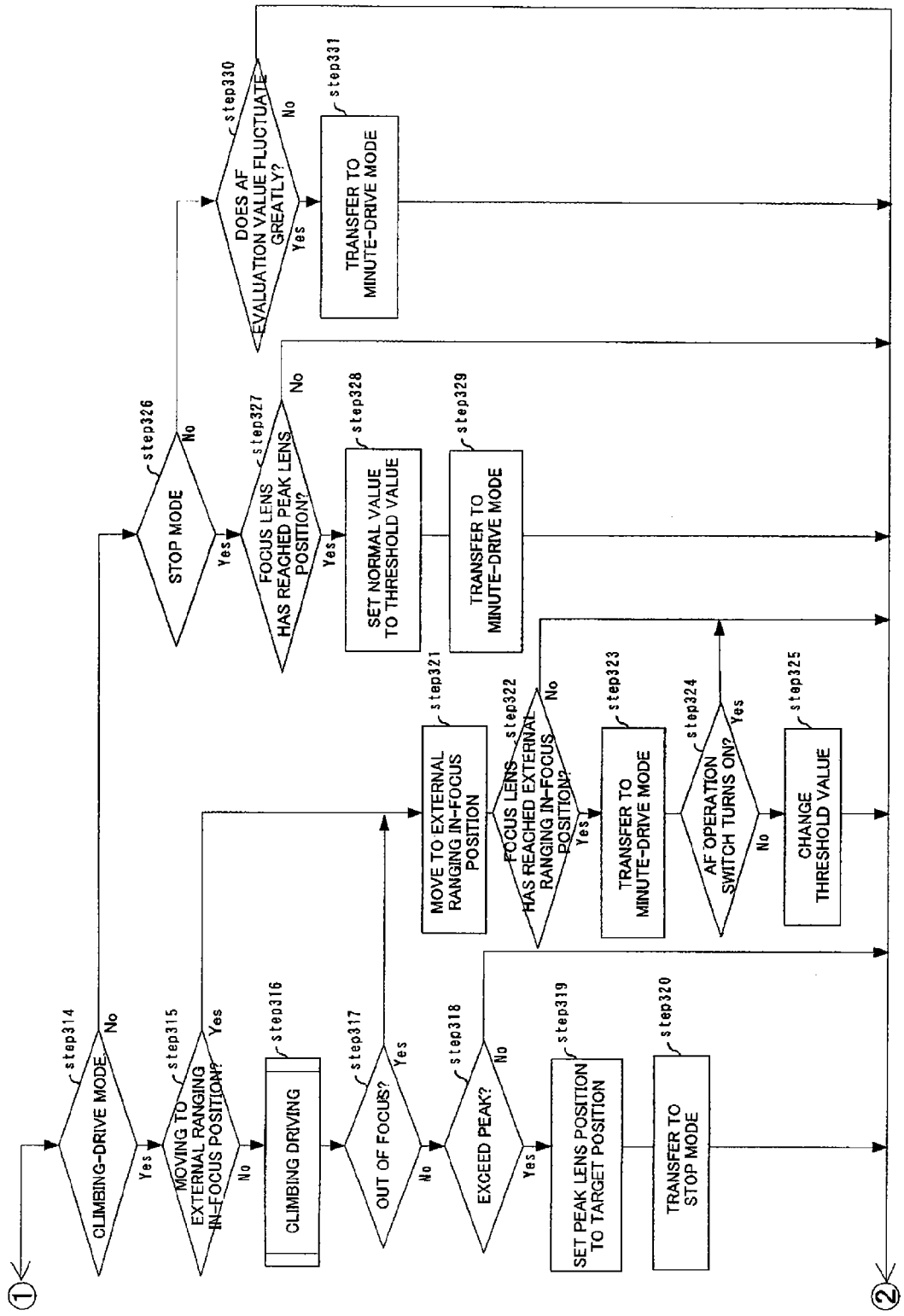

Referring now to FIGS. 2A and 2B, the overall AF control flow will be described. Each circled numeral is connected in FIGS. 2A and 2B.

At Step 301, the microcomputer 115 starts the process.

At Step 302, the microcomputer 115 takes in the AF evaluation value and external ranging in-focus position.

Step 303 provides processes corresponding to inputs of the AF operation switch 117 and the AF/MF switch 118. This input process will be described in detail with reference to FIG. 5.

Step 304 determines whether or not the AF mode is set in the process of Step 303, and the procedure moves to Step 305 when the AF mode is set. When the AF mode is not set, the procedure returns to Step 302 without performing the AF control.

Step 305 determines whether the TV-AF mode is a minute-drive mode. When the minute-drive mode is set, the procedure moves to Step 306, and otherwise the procedure moves to Step 304.

Step 306 provides the TV-AF minute-drive mode to determine whether or not the in-focus state is reached and to find a direction to the in-focus state (referred to as an "in-focus direction" hereinafter) when the in-focus state has not yet been reached. A detailed operation will be described later with reference to FIG. 3.

Control over a minute-drive operation of the focus lens 105 used to determine the in-focus direction from a change of the AF evaluation value can also be referred to as an in-focus direction determination control. Control over a minute-drive operation of the focus lens 105 used to determine, from a change of the AF evaluation value, whether or not the in-focus state is reached can also be referred to as an in-focus confirmation control.

Step 307 determines whether or not the AF evaluation value is smaller than a predetermined threshold value. When it is smaller than the threshold value, the procedure move to Step 308, and when it is greater the procedure moves to Step 310. The threshold value may be determined with reference to the AF evaluation value at which the object image is too blurred to be recognized.

Step 308 determines an immediate transfer to the TV-AV climbing drive (in-focus position detection control) so as to avoid a deterioration of the AF's responsiveness, because the AF evaluation value is so small that it is difficult to detect the in-focus direction, and the direction determination requires a long time. The microcomputer 115 sets to the climbing direction from the current focus lens a direction that is likely to include the in-focus position, and transfers the procedure to Step 309. For instance, the climbing direction is set to the near direction when the current focus lens position is located at the infinite side, and the climbing direction is set to the infinite direction when the current focus lens position is located at the near side.

At Step 309, the procedure moves to the climbing-drive mode that provides a climbing-drive operation.

Step 310 determines whether or not the in-focus determination is completed at Step 306. When the in-focus determination is completed, the procedure moves to Step 312 to provide the restart determination mode. When the in-focus determination has not yet been completed, the procedure moves to Step 311.

Step 311 determines whether or not the in-focus direction determination is completed at Step 306. When the in-focus direction determination is completed, the procedure moves to Step 310 to provide the climbing-drive mode. When the in-focus direction determination has not yet been completed, the procedure moves to Step 302.

Step 312 stores the AF evaluation value at the in-focus position in a memory (not shown).

At Step 313, the procedure moves to the restart determination mode.

Step 314 determines whether or not the climbing-drive mode. When the climbing-drive mode is set, the procedure moves to Step 315, and otherwise the procedure moves to Step 326.

Step 315 determines whether or not the focus lens 105 is moving to the external ranging in-focus position. If so, the procedure moves to Step 321, and if not the procedure moves to Step 316.

At Step 316, the focus lens 105 is climb-driven at a predetermined speed. A detailed description of the climb drive will be described later with reference to FIG. 4.

Step 317 determines, during the climb drive at Step 316, whether or not focusing is determined unavailable in accordance with a predetermined out-of-focus condition. When it is determined that the in-focus is unavailable, the procedure moves to Step 321. One out-of-focus condition is that no in-focus position is specified irrespective of a movement of the focus lens 105 in the overall stroke or in a predetermined range in the overall stroke from the infinite end to the near end.

Step 318 determines whether or not the AF evaluation value exceeds a peak in the climbing drive in Step 316. When the AF evaluation value exceeds the peak, the procedure moves to Step 319, and when the AF evaluation value does not exceed the peak, the procedure returns to Step 302 to continue the climbing drive.

Step 319 returns the focus lens 105 to a position that provides a peak AF evaluation value (referred to as a "peak position" hereinafter).

At Step 320, the procedure moves to a stop mode.

Step 321 moves the focus lens 105 to an external ranging in-focus position calculated based on the object distance information from the external ranging unit 116.

Step 322 determines whether or not the focus lens 105 reaches the external ranging in-focus position. When the focus lens 105 reaches the external ranging in-focus position, the procedure moves to Step 323, and when the focus lens 105 does not reach the external ranging in-focus position, the procedure returns to Step 302 to continue driving to the external ranging in-focus position.

At Step 323, the procedure moves to the minute-drive mode.

Step 324 determines whether or not the focus lens 105 has reached the external ranging in-focus position in accordance with a manipulation of the AF operation switch 117. When the focus lens 105 has reached the external ranging in-focus position, the procedure returns to Step 302 to provide the minute-drive mode. Otherwise, the procedure moves to Step 325.

Step 325 sets a value smaller than a normal value to a threshold value used for Step 307 so that the process of Step 307 cannot enter the climbing-drive mode. This embodiment changes the TV-AF characteristic (threshold value) and again searches for the in-focus position after moving the focus lens 105 to the external ranging in-focus position when the in-focus position cannot be detected in the climbing drive. Thereby, highly precise focusing is available to an object that cannot be focused by the TV-AF.

Step 326 determines the existence of the stop mode. When the stop mode exists, the procedure moves to Step 327, and otherwise the procedure moves to Step 330.

Step 327 determines whether or not the focus lens 105 has returned to the peak position. When it is returned to the peak position, the procedure moves to Step 328, and otherwise the procedure moves to Step 302 to continue returning action to the peak position.

Step 328 sets a normal value to a threshold value used for Step 307.

At Step 329, the procedure moves to the minute-drive mode.

Step 330 is executed in the restart determination mode. This Step 330 compares the AF evaluation value stored in Step 312 with the latest AF evaluation value, and determines whether a difference between them or a fluctuation of the AF evaluation value is greater than a predetermined value. When the fluctuation of the AF evaluation value is greater than the predetermined value, the procedure moves to Step 331 or the minute-drive mode. When the fluctuation of the AF evaluation value is smaller than the predetermined value, the procedure moves to Step 302.

At Step 331, the procedure moves to the minute-drive mode.

Figure 3:
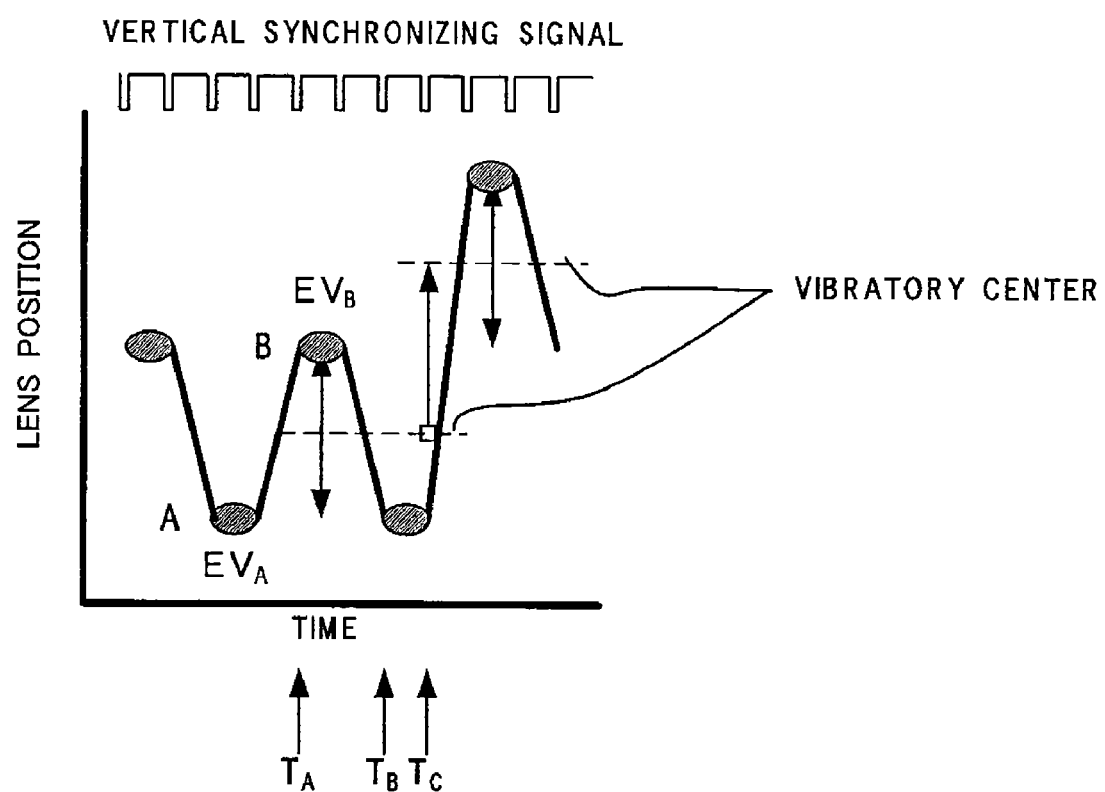
FIG. 3 is a view for explaining a minute-drive operation in the TV-AF.

Referring now to FIG. 3, the minute-drive operation will be described. FIG. 3 shows a relationship between a movement of the focus lens 105 and a change of the AF evaluation value in the minute-drive operation, where an abscissa axis denotes time, and an ordinate axis denotes a focus lens position. A vertical synchronizing signal of a video signal is shown above the chart.

AF evaluation value $EV_A$ for charges (beveled eclipse) accumulated in the image-pickup element 106 during period A is taken in at time $T_A$. AF evaluation value $EV_B$ for charges accumulated in the image-pickup element 106 during period B is taken in at time $T_B$. At time $T_C$, the AF evaluation values $EV_A$ and $EV_B$ are compared with each other, and a driving (oscillatory) center of the minute driving is moved when $EV_B > EV_A$ (i.e., driving amplitude=oscillation amplitude+ center-moving amplitude). On the other hand, when $EV_A > EV_B$, the oscillatory center is not moved (i.e., driving amplitude=oscillatory amplitude). The minute-drive operation thus detects a direction in which the AF evaluation value increases while moving the focus lens 105, and a focus lens position (peak position) that maximizes the AF evaluation value.

Figure 4:
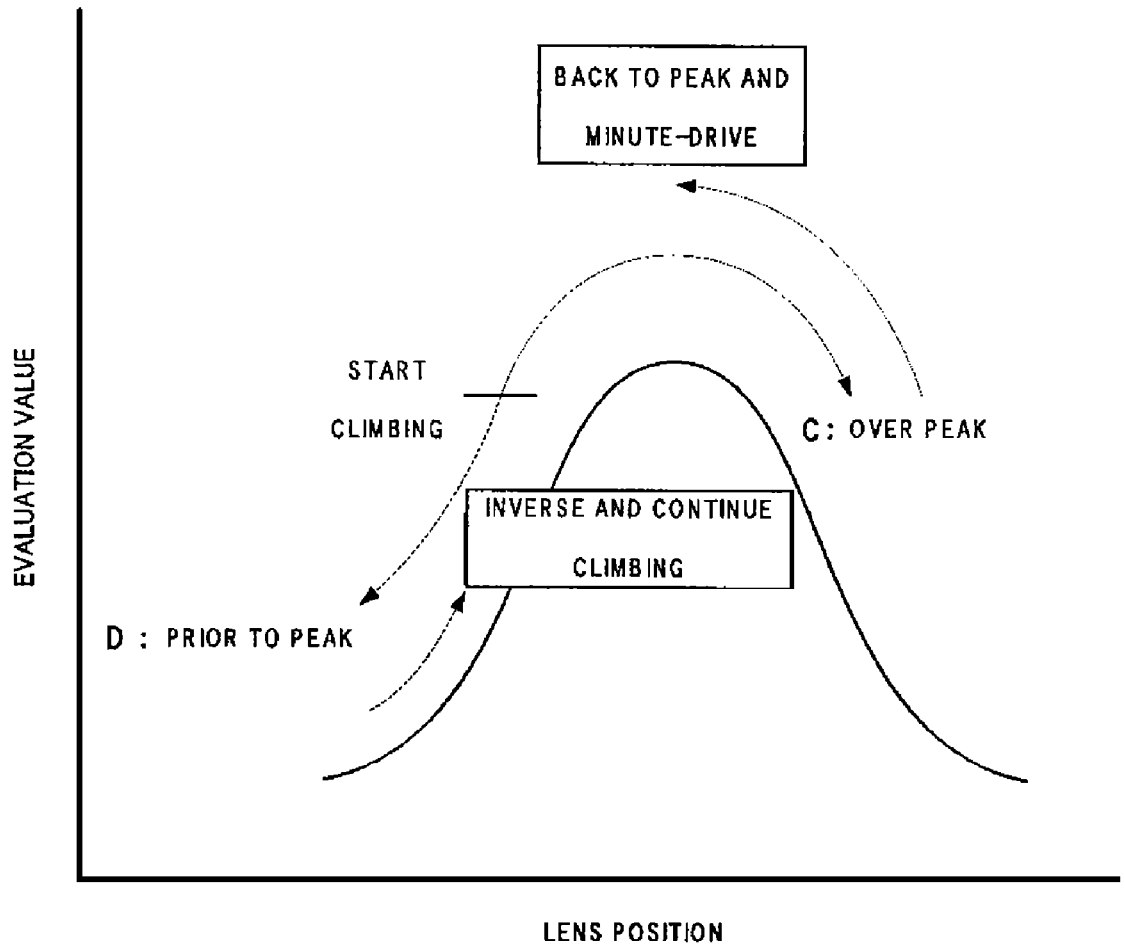
FIG. 4 is a view for explaining a climbing-drive operation in the TV-AF.

Referring now to FIG. 4, a description will be given of the climbing-drive operation that quickly drives the focus lens 105 and detects the peak position of the AF evaluation value or its vicinity. FIG. 4 shows a relationship between a movement of the focus lens 105 and a change of the AF evaluation value in the climbing-drive operation. In a movement of C, the AF evaluation value decreases beyond the peak, the existence of the peak position (in-focus position) can be confirmed, and the climbing-drive operation is terminated and moved to the minute-drive operation. On the other hand, a movement of D monotonically decreases with no peak, and a driving direction of the focus lens 105 can be determined erroneous. In this case, the driving direction is inversed and the climbing-drive operation continues.

Figure 5:
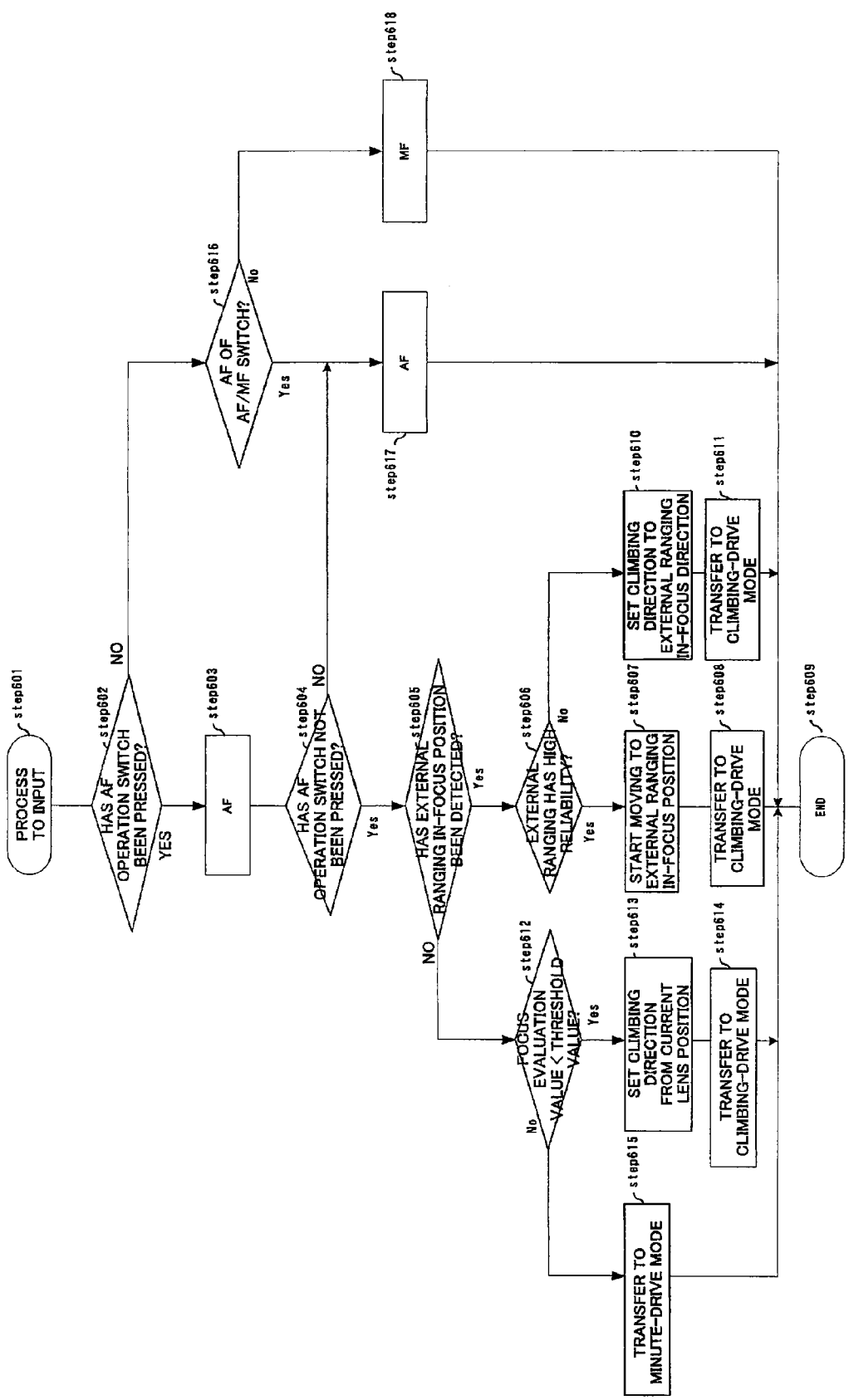
FIG. 5 is a flowchart for explaining an input process according to one embodiment.

Referring now to FIG. 5, a description will be given of an input process in Step 303.

At Step 601, the microcomputer 115 starts processing.

At Step 602, the microcomputer 115 determines whether or not the AF operation switch 117 is manipulated. If the AF operation switch 117 is manipulated, the procedure moves to Step 603, and otherwise the procedure moves to Step 616.

At Step 603, the AF mode is set.

Step 604 determines whether or not the AF operation switch 117 was manipulated before Step 602. If it has not been manipulated, the procedure moves to the process subsequent to Step 605. If the AF operation switch 117 was manipulated before Step 602, the procedure moves to Step 617.

Step 605 determines whether or not the external ranging in-focus position is calculated or whether the external ranging unit 116 has detected the object distance. When the external ranging in-focus position is calculated, the procedure moves to Step 606, and otherwise the procedure moves to Step 612.

Step 606 determines whether or not the reliability of the object distance information obtained by the above method is higher than a predetermined level (or first value). When the reliability is higher than the predetermined level, the procedure moves to Step 607, and otherwise the procedure moves to Step 610.

Step 607 starts moving the focus lens 105 to the external ranging in-focus position calculated based on the object distance having the high reliability. The focus lens 105 is moved to the external ranging in-focus position in response to the manipulation of the AF operation switch 117, only when the external ranging in-focus position is calculated based on the object distance having high reliability. The external ranging in-focus position calculated based on the object distance having low reliability is likely to contain an error. The above configuration surely prevents a movement of the focus lens 105 to the possibly erroneous external ranging in-focus position.

Step 608 sets the climbing-drive mode.

Step 610 sets a direction of the calculated external ranging in-focus position to a driving direction of the focus lens 105 in the climb driving. This is because the direction of the in-focus position is reliable, even when the reliability of the object distance information is determined low in Step 606, and the precision of the calculated external ranging in-focus position is low.

Step 611 moves the procedure to the climbing-drive mode. Thus, when the reliability of the object distance information is low, only the information of the direction of the in-focus position calculated based on the object distance information is utilized to determine the climbing-drive direction without conducting the minute-drive operation.

This configuration can expedite the TV-AF operation because no minute-drive operation is performed to determine the in-focus direction. In addition, in that case, the focus lens 105 is climb-driven in the external ranging in-focus position while the AF evaluation value is monitored. Therefore, a continuation of the climb driving in a wrong direction can be prevented even when the reliability of the object distance information is low.

Step 612 determines whether the AF evaluation value is smaller than the threshold value when the external ranging in-focus position is not calculated in Step 605. The procedure moves to Step 613 when the AF evaluation value is smaller than the threshold value, and otherwise the procedure moves to Step 615.

Step 613 determines an immediate transfer to the climbing-drive mode due to the same reason as Step 308, because the AF evaluation value is small. In addition, a direction that is likely to include the in-focus position from the current focus lens position is set to the climbing direction, and the procedure moves to Step 614. The threshold value used herein may be determined like the threshold value of Step 307. A direction that is likely to include the in-focus position is as described in Step 308.

At Step 614, the procedure moves to the climbing-drive mode.

When the external ranging in-focus position is not calculated and when the AF evaluation value is smaller than the threshold value, the climbing-drive operation is performed from the current focus lens position to the direction that is likely to include the in-focus position, in response to a manipulation of the AF operation switch 117. Thereby, a good TV-AF responsiveness can be maintained even when it is difficult to detect the in-focus direction from the AF evaluation value.

At Step 615, the procedure moves to the minute-drive mode.

When the external ranging in-focus position is not calculated, and when the focus evaluation value is higher than the threshold value, the minute-drive operation detects the in-focus direction in response to the manipulation of the AF operation switch 117. In this case, the in-focus direction can be surely detected because the direction that is likely to include the in-focus position is detected by using the AF evaluation value.

Step 616 determines whether the AF/MF switch 118 selects the AF or the MF. When it selects the AF, the procedure moves to Step 617 to set the AF mode. When it selects the MF, the procedure moves to Step 618 to set the MF mode. No AF operation is performed in the MF mode, unless the AF operation switch 117 is manipulated. On the contrary, this embodiment executes the AF operation when the AF operation switch 117 is manipulated no matter whether the AF/MF switch 118 selects the AF or MF. This enables a photographer to temporarily or suddenly use the AF without switching the AF/MF switch 118.

As discussed, this embodiment can maintain highly responsive focus control (TV-AF and external ranging AF) as one advantage of the phase difference detection method, in response to a photographer's manipulation of AF operation switch 117, realizing the focus control fit for the photographer's intension. The focus control is varied in accordance with the reliability of the object distance information and the state of the AF evaluation value when the AF operation switch 117 is manipulated. Therefore, focus control having the best responsiveness and precision is available according to the circumstances.

The above embodiment provides TV-AF focus control that uses the first information, such as the AF evaluation value, when the first operating member is not operated. When the first operating member is operated, focus control (such as focus control by the phase difference detection method) other than the TV-AF method is performed which uses the second information, such as the object distance and the phase difference. This configuration provides focus control fit for the user's intension. The TV-AF focus control that uses the second information may start in response to an operation of the first operating member, so as to expedite the TV-AF focus control.

The above embodiment discusses the hybrid AF that combines the external phase difference detection (external ranging) method with the TV-AF method, although the embodiment of the present invention may include an image-pickup apparatus that adopts the hybrid AF that combines the internal phase difference detection method and the TV-AF method. The internal phase difference detection method detects a phase difference between one or more pairs of images formed by the light from an object which has passed an image-pickup optical system, calculates a defocus amount of the image-pickup optical system based on the phase difference, and then calculates a driving amount and direction to move a focus lens to the in-focus position. In this case, the AF control can be performed similar to the above embodiment by replacing the external ranging in-focus position in the above embodiment with the in-focus position corresponding to the driving amount.

While the above embodiment discusses the AF operation that starts in response to the manipulation of the AF operation switch 117 irrespective of the state of the AF/MF switch 118, the present invention allows the AF operation to start in response to the manipulation of the AF operation switch 117 only when the AF/MF switch 118 selects the AF or MF.

While the present invention has been described with reference to exemplary embodiments, it is to be understood that the invention is not limited to the disclosed exemplary embodiments. The scope of the following claims is to be accorded the broadest interpretation so as to encompass al modifications, equivalent structures and functions.

This application claims a benefit of priority based on Japanese Patent Application No. 2006-201996, filed on Jul. 25, 2006, which is hereby incorporated by reference herein in its entirety as if fully set forth herein.

What is claimed is:

1. An image-pickup apparatus comprising:
   a first detector configured to generate first information corresponding to a contrast state of a picked-up image;

a second detector configured to detect second information corresponding to a distance to an object;
a controller configured to provide focus control; and
an operating member operable by a user,
wherein the controller provides the focus control that uses the first information but does not use the second information when the operating member is not operated,
wherein the controller provides the focus control that uses at least the second information when the operating member is operated and the second information is detected, and
wherein the controller provides the focus control that uses the first information but does not use the second information when the operating member is operated and the second information is not detected.

2. An image-pickup apparatus according to claim 1, wherein the focus control that uses at least the second information contains first focus control that uses the first and second information, and second focus control that uses the second information but does not use the first information.

3. An image-pickup apparatus according to claim 2, wherein the controller provides, when the operating member is operated, the focus control that uses the first information after the second focus control.

4. An image-pickup apparatus according to claim 2, wherein the first focus control is an in-focus position detection control used to detect an in-focus position based on a change of the first information in accordance with a movement of the focus lens, and wherein the controller sets a moving direction of the focus lens to the in-focus position detection control based on the second information.

5. An image-pickup apparatus according to claim 1, further comprising an operating switch operable by the user in order to enable the controller to provide the focus control, the controller providing the focus control that uses at least the second information in accordance with an operation of the operating member irrespective of an operating state of the operating switch.

6. A focus control method comprising the steps of:
obtaining first information corresponding to a contrast state of a picked-up image;
obtaining second information corresponding to a distance to an object;
detecting an operation of an operating member operable by a user; and
providing focus control that uses the first information but does not use the second information when the operation of the operating member is not detected,
providing focus control that uses at least the second information when the operation of the operating member is detected and the second information is obtained, and
providing the focus control that uses the first information but does not use the second information when the operation of the operating member is detected and the second information is not obtained.

* * * * *